Sept. 25, 1934. J. H. COLLINS 1,974,643
GUARD FOR STOVES
Filed June 11, 1930
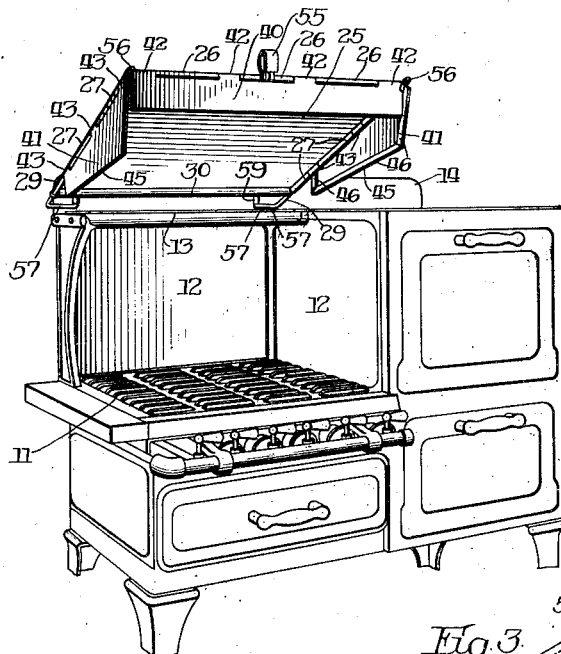
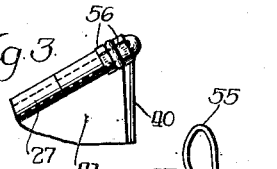
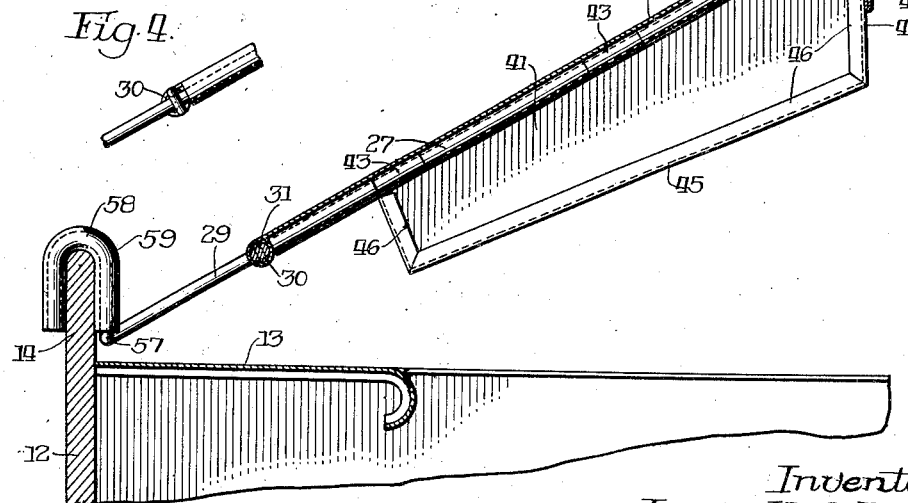
Inventor
James H. Collins
By Cromwell Greist & Warden attys Patented Sept. 25, 1934

1,974,643

UNITED STATES PATENT OFFICE 1,974,643

GUARD FOR STOVES

James H. Collins, Chicago, Ill.

Application June 11, 1930, Serial No. 460,333

7 Claims. (Cl. 126—299)

This application relates to a guard for stoves, and it particularly relates to a grease guard for the purpose of protecting the ceiling, side walls and woodwork from the splashing and sputtering of the material cooking or frying upon a kitchen stove.

An object of this invention is to provide an improved grease and dirt guard for kitchen stoves.

Another object of the present invention is to provide a guard for kitchen stoves which may be readily attached to the ordinary type kitchen stove and at the same time easily collapsed when not being utilized and conveniently stored.

Other objects will appear during the course of the following specification.

In one embodiment of the present invention a rectangular or square plate is positioned over the frying or cooking grid of the stove. The plate is preferably supported upon the top of the rear wall of the stove and extends outwardly and upwardly at an angle varying between 10 to 50° to the horizontal. To the front and sides of the plate are attached depending sections which are preferably pivotally connected or hinged to said plate. In the embodiment shown the edges of the plate and depending sections are rolled over and cooperate in receiving pivot rods which are interconnected. In this embodiment the side pivot rods are extended and serve to grasp, or support the guard upon the rear wall of the stove.

In the drawing is shown one embodiment of the invention, to which it is, however, by no means restricted:

Fig. 1 is a perspective view of the grease guard in position upon a standard type kitchen stove;

Fig. 2 is a side sectional view thereof; and

Figs. 3 and 4 are detail views showing the manner of construction.

In Fig. 1 the kitchen stove is provided with a grid-like shelf or table 11 which is adapted to support the various pots and pans used in the cooking and/or frying operation. Beneath this grid 11 is positioned a series of burners (not shown). This cooking shelf is enclosed to the rear and on one side by the walls 12. At the top of the rear wall 12 is a narrow shelf 13. Forming a continuation of the rear wall 12 and extending upwardly from the shelf 13 is the vertical member 14 which forms a support for the grease guard to which this invention is particularly directed.

The grease guard is provided with a central plate 25 which, in the embodiment shown, is of square or rectangular shape. This plate, however, may be made of many other shapes. Portions 26, at the front of the plate 25, and portions 27, at the sides of the plate 25, are rolled over to form supports for the rods 28 and 29, respectively. The rear edge of the plate is also adapted to be rolled over, as indicated at 30, to receive a rod 31. The rods 29 extend parallel with each other at the sides of the plate 25 and constitute supporting members for this plate, while the rods 28 and 31 likewise extend parallel with each other, but at right angles to the rods 29, the rods 28 and 29 constituting connecting members by which the front and rear ends of the plate 25 are held in rigid relation to the rods 29, and all of said rods forming a frame for the plate 25. To the front and sides of the plate 25 are attached the hinged front member 40 and the hinged side members 41, respectively. These front and side members 40 and 41 consist of rather narrow plates which are adapted to be suspended substantially vertically from the front and side edges of the plate 25. The front plate 40 is approximately of rectangular shape, while the side plates 41 (see Fig. 2) have their front edges 44 sloping inwardly so that the plate 40 may rest against the front edges thereof and at the same time be positioned vertically. The hinged edges of these side plates 40 and 41 are rolled, as indicated at 42 and 43, and fit over the rods 28 and 29, respectively. In the embodiment shown the rolled over portions 42 and 43 are adapted to fill up the spaces between the rolled over portions 26 and 27 of the main plate 25, respectively. The lower edges 45 of the side plates 41 slope to the rear when in suspended position approximately parallel to, but slightly converging with, the main plate 25. The edges 46 are bent over as indicated to present a better appearance.

To the front rod 28 is also pivotally attached a hook 55 which is adapted to support the guard on the rear of the stove when the guard is collapsed and not being utilized.

The rods 28 and 30 are not adapted to turn within the rolls 26—42 and 30 respectively, and their ends are preferably attached to the side rod 29 in such a manner that the side rods 29 are free to rotate in spite of such attachment. This attachment may be made in many ways, but is desirably made by supplying the ends of the rods 28 and 30 with eyelets which fit around and enclose the rods 29 (see Figs. 3 and 4). The rods 29 are adapted to rotate in the rolls 27—43 and they are kept from sliding out of said rolls by means of lock nut arrangements 56 which are attached to the front ends of the rods (see Fig. 4). The lock nut arrangement should embrace the eyelet attached to the end of the rod 28 in such manner as to prevent longitudinal displacement while permitting rotational displacement.

The ends of the rods 29 are bent over at right angles, as indicated at 57. At the end of the bent-over portions 57 there are U-shaped portions which are adapted to fit over and support the guard upon the rear wall 14. The U-portions 58 are preferably enclosed in a rubber sleeve 59 which prevents the guard from marring or scratching paint or enamel upon the wall 14. The portions 57 serve to assist the U-members 58 in supporting the guard in proper position upon the upper extension 14 of the rear wall of the stove.

It will be noted when the guard is supported as shown in Figs. 1 and 2 it will extend upwardly and outwardly over the cooking or frying shelf at a substantial distance thereabove and at an angle of about 15 to 25°. The position of the guard may be varied so that it may be placed in any angular position from the horizontal to an angle of 50 or 60°. An angle of less than 45° is generally preferred. When the guard is removed from the stove, the sides 26 and 27 are adapted to be folded in and the bent portions 57 and 58 at the end of the rod 29 may be turned to any desired position. The collapsed structure then may be supported on the rear of the stove by means of the hook 55.

The structure is made of metal, preferably of aluminum or block sheet tin, and weighs about 2½ pounds. It is fireproof, easy to clean with soap and water, and may be readily attached to the usual stove. It will fit on stoves of varying size and also on stoves with either right or left hand burners. It is obvious that many modifications may be made in the structure shown and described. For example, the portions 57 at the end of the rod may be omitted, or the ends of the rods 29 may be bent into different shapes to support the guard upon the extension 14 of the wall 12. The supporting member 14 may also be positioned so that it extends to the rear and, in a sense, forms a continuation of the shelf 13 which would also require modification of the ends of the rods 29. The side plates 45 may also be directly hinged to the plate 25 and the rods 29, if desired, may be caused to terminate adjacent the rear edge of the plate 25. In the construction shown the rods 28 and 30 are preferably of wood so that the connecting eyelets may be readily attached to their ends.

The foregoing detailed description has been given for clearness of understanding only and no unnecessary limitation should be understood therefrom, but the appended claims should be construed as broadly as permissible in view of the prior art.

What is claimed is:

1. A stove guard, provided with a plate adapted to extend outwardly over the cooking and frying sections of the stove and means for attaching said plate to the rear of the stove, comprising a vertical upwardly projecting member on the rear of the stove, rods attached to each side of the plate, and U-shaped portions at the ends of said rods adapted to fit over and position the plate upon said vertical members.

2. A stove guard, provided with a plate adapted to extend outwardly over the cooking and frying sections of the stove and means for attaching said plate to the rear of the stove, comprising a vertical upwardly projecting member on the rear of the stove, and rolls in the sides of the plate, rods adapted to be positioned and turn within the rolls, the rear ends of the rods being provided with portions perpendicular to the rods, to the ends of which perpendicular portions are attached U-bent portions, the planes of which are perpendicular to said first mentioned portions.

3. A stove guard, provided with a plate adapted to extend outwardly over the cooking and frying sections of the stove and means for attaching said plate to a vertical member above the rear wall of the stove, rods attached to each side of the plate, the front ends of said rods terminating at the front of the plate and the rear ends being extended beyond the plate and provided with portions bent inwardly at right angles to the rods, which portions are adapted to contact with the front side of said vertical member, the ends of said bent portions being provided with U-shaped portions the planes of which are perpendicular to said bent portions, said U-portions being adapted to fit upon the vertical member and support the plate therefrom.

4. A stove guard, comprising a cover plate adapted to extend outwardly at an upward inclination above the cooking and frying portions of the stove, hinged plates extending downwardly from the outer edge of said cover plate and from the sides thereof, and hinge rods for said plates, the hinge rods for said side plates having extensions provided with U-shaped portions adapted to fit over the back of a stove, the hinged rods of said front plate having eyelets encompassing the hinge rods of said side plates.

5. A detachable stove hood to cover the cooking top of a stove comprising a frame formed of parallel supporting rods arranged in spaced relation and connecting rods extending at right angles to said supporting rods and also arranged in spaced relation, a cover plate mounted on said rods and supported thereby, means at corresponding ends of the supporting rods for detachably supporting the hood on the back member of a stove, whereby said frame and said plate are detachably held upon said stove above the cooking portions thereof, and depending front and side plates carried by said frame and located at the front and side edges of said cover plate and serving as guard members for the latter.

6. A detachable stove hood to cover the cooking top of a stove comprising a frame formed of parallel supporting rods arranged in spaced relation and connecting rods extending at right angles to said supporting rods and also arranged in spaced relation, a cover plate mounted on said rods and supported thereby, angularly-disposed fastening means arranged at corresponding ends of the supporting rods for detachably supporting the hood on the back member of a stove, whereby said frame and said plate are detachably held upon said stove above the cooking portions thereof in angular relation to the latter, and depending front and side plates carried by said frame and located at the front and side edges of said plate and serving as guard members for the latter.

7. A detachable stove hood to cover the cooking top of a stove comprising a frame formed of parallel supporting rods arranged in spaced relation and connecting rods extending at right angles to said supporting rods and also arranged in spaced relation, a cover plate mounted on said rods and supported thereby, means at corresponding ends of the supporting rods for detachably supporting the hood on the back member of a stove, whereby said frame and said plate are detachably held upon said stove above the cooking portions thereof, and depending front and side plates carried by said frame and hingedly connected thereto to be collapsed thereon, said front and side plates being located at the front and side edges of said cover plate and serving as guard members for the latter.

JAMES H. COLLINS.